May 14, 1968

A. VAN DER JAGT ETAL 3,383,542

ASSEMBLY OF ELECTRODES WITH ALIGNED GRID WIRES
FOR ELECTRON DISCHARGE DEVICES

Filed March 9, 1965

3,383,542
ASSEMBLY OF ELECTRODES WITH ALIGNED GRID WIRES FOR ELECTRON DISCHARGE DEVICES
Anton van der Jagt and Goliardo Miale, Bath, N.Y., assignors to Westinghouse Electric Corporation, Pittsburgh, Pa., a corporation of Pennsylvania
Filed Mar. 9, 1965, Ser. No. 438,272
14 Claims. (Cl. 313—350)

ABSTRACT OF THE DISCLOSURE

This invention relates to an assembly of frame type grid electrodes having grid wires which are disposed to be aligned with grid wires of successively disposed electrodes. In one illustrative embodiment, the electrode assembly includes a first (or control) electrode, a second, and a third electrode. The first electrode includes two side support rods to which are secured on both sides thereof cross straps, and a lateral grid wire wound about the side support rods in a regular helical array. The second and third electrodes include side support rods, at least one cross strap disposed upon a first side of said side rods and a regular array of lateral grid wires disposed upon a second side of the side support rods. Further, the second side of the second and third electrodes is disposed toward the grid wire of the first or control electrode in a close, adjacent relationship. In order to align the corresponding lateral grid wires of the first electrode with the lateral grid wires of the second and third electrodes, the second and third electrodes are wound in an opposite direction to that with which the lateral grid wires are wound about the side support rods of the first electrode. By critically spacing the lateral grid wires from the cross strap, the lateral grid wires may be so disposed upon the side rods during the winding of the electrodes, so that when they are assembled upon a reference element the lateral grid wires are automatically aligned with each other.

---

This invention relates to electron discharge devices and more specifically to improvements in electrode structures thereof. In particular, this invention deals with electron discharge devices having concentric or coaxial grid electrodes with the active portions of the grid wires of each of the concentric grids aligned with each other, and with the apparatus and method for manufacturing the aforementioned grid electrodes.

In many applications of electron discharge devices where the device is to be operated at high frequencies and/or at low noise levels, the distances or spacings between the lateral wires of the successive grid electrodes and between the cathode element and the lateral grid wire of the first grid electrode must be made smaller and with greater precision than in other electron discharge devices.

If the spacing between the cathode and the control grid is not accurately controlled, a great difference in the performance of similarly designed tubes will be obtained when produced by mass production methods. The transconductance of such devices in general varies as a function of the spacing between the lateral wires of the concentric grid and the surface of the cathode; therefore, this spacing must be accurately set if a product having uniform characteristics is to be manufactured.

Further, one of the major problems encountered in the electron discharge devices of the prior art is that of maintaining the active portions of the grid wires of successive grid electrodes in an aligned relationship. Typically, the electrode structure of such devices comprises a pair of relatively heavy wires which are generally known as support wires or side rods about which is wound a relatively thin grid wire. That portion of the grid wire across which the beam of electron flows is designated as the active portion. As the prior art will indicate, many attempts have been made to align the active portions of the successively oriented grid electrodes. It may be understood that if the active portions are not aligned that the stream of electrons flowing from the cathode to the anode may be substantially impeded by a misplaced grid wire. More specifically, the electrons which are being accelerated toward the anode may strike the second grid electrode thereby decreasing the efficiency of this device. It has been calculated that in an aligned, two grid electrode device that only one out of every 20 electrons flowing from the plate to the anode will be absorbed by the second electrode, whereas if the concentric grid electrodes are not aligned that as many as one out of every three electrons may strike the second grid electrode thereby being absorbed and introducing a spurious noise in the output signal of such a device. Further, the current so absorbed by the misaligned grid will be radiated in the form of heat which may materially shorten the life of the electron tube device as well as its associated components.

Further, a reduction in the current absorbed by the second grid electrode may be achieved by reducing the spacing between the lateral portions of the successively orientated grid electrodes. It may be understood that as the flow of electrons is emitted from the surface of the cathode element that the flow tends to expand as it proceeds toward the anode element. As will be explained later, it is desired to position the active portions of the grid wire of the second electrode as close to the surface of the lateral grid wire of the first grid as is possible. In this manner, the current absorbed by the second grid electrode may be reduced in that the flow of electrons is confined at these relatively small distances to a narrow beam which may be directed between the active portions of the grid wire of the second grid electrode.

Another difficulty in producing a high performance tube using ordinary type grids results from the necessity of using a very thin lateral grid wire and providing a greater number of turns per inch of this wire. In the ordinary type of grid structure there are no means to establish an accurate and rigid spacing between the side support rods. Though it is the usual custom to place the side support rods between a pair of mica spacers, it is difficult to form and assemble a grid electrode with a great number of thin lateral grid wires upon these spacers. As long experience in the manufacture of such grid electrodes will demonstrate, such a method of assembly and structure is limited to those grid structures wherein the lateral grid wires are capable of supporting the side rods. However, in order to obtain a grid structure with a high number of turns of lateral grid wire, it is necessary to reduce the size of the lateral wire. In such applications it may be necessary to use lateral grid wire having a thickness of only .5 or .3 mil. Thus, the lateral wires of the grid electrode, in general, become weaker so that it becomes difficult if not impossible to maintain the tension upon such wire and to maintain the uniform dimensions between the lateral wires of successive grid electrodes.

A possible avenue for the solution of this problem has been the utilization of a frame type support structure upon which the fine lateral grid wire may be wound. Typically, such frame support structures consist of two support rods which are interconnected rigidly by a plurality of members or straps. It is noted that such structures may be formed as by stamping out a unitary structure or by welding the individual straps to the support rods. In either case, a rigid structure is produced about which the fine grid wire may be placed.

Though the use of an extremely thin lateral grid wire does minimize to a certain degree the interception of current by the second grid electrode, it is further desired to obtain maximum performance by accurately aligning the active portions of the lateral grid wires of successive electrodes. In the process of assembling ordinary grid electrodes, it has been a typical procedure to align the active portions of the lateral grid wires by visually sighting the active portions of the grid wires and adjusting the side rods with respect to each other so that the active portions are aligned with each other. It may be understood that in ordinary grid structures where the lateral wire has an appreciable dimension, that visual sighting, though tedious, is possible. However, where the grid wire may have a dimension of only .2 or .3 mil, it may be difficult if not impossible to sight the lateral grid wire except with a very high powered image magnifying instrument. Obviously, such a process would be extremely time consuming and not adaptable to mass production methods.

Further, the noise level of the output signal of an electron discharge device may be minimized by spacing the grid electrodes very close to each other; the minimum spacing achieved by ordinary grid electrodes is about 20 mils. As noted above, it is difficult to suspend each lateral grid wire in a precise and rigid manner; as a result the spacing between successive electrodes may vary. With the use of frame grid structures, the lateral grid wires may be mounted precisely and render sufficient tension to maintain uniform spacings between successive electrodes. However, it has been found that the inherent thicknesses of the straps or members interconnecting the side rods of such a frame grid structure inherently limits the minimum spacing between grid electrodes. Frame grid structures of the prior art have attempted to eliminate this problem by deforming the frame straps so as to remove the frame strap from the plane in which the lateral grid wires lie. Obviously, such a process adds an additional step to the manufacture of such frame grids. Further, it may be realized that the forming or bending of the frame straps may also deform the lateral grid wires which have been suspended upon the frame and that to maintain the precise configuration of grid wires, expensive and complicated machinery may be needed to properly perform this operation.

Accordingly, it is the general object of this invention to provide a new and improved electron discharge device.

It is another object to provide an improved electron discharge device wherein the active portions of adjacent electrodes are aligned with respect to each other.

It is a further object of this invention to provide a new and improved electron discharge device wherein successively disposed electrode structures may be spaced from each other by a minimum distance.

It is a still further object of this invention to provide an improved method and apparatus for winding in mass production a large number of grid electrodes in which the prealignment of the active portions of the grid wires may be accomplished as the grid electrodes are being wound.

It is a still further object of this invention to provide an improved electron discharge device, wherein the current absorbed by the second grid electrode is minimized, and the ratio between the current received by the anode element and the current intercepted by the second grid electrode is maximized.

It is another object of this invention to provide an improved electron discharge device wherein the ratio of the electron current received by the anode element to the electron current intercepted by the second grid electrode exceeds 150.

Briefly, the present invention accomplishes the above-cited objects by providing an improved electron discharge device wherein the active portions of the lateral grid wires or adjacent electrodes are aligned with respect to each other and are spaced a minimal distance from each other. In particular, the lateral grid wire is wound about each of the grid electrodes so that corresponding active portions of the grid wires are spaced a predetermined distance from a reference point upon each of the grid electrodes; the electrodes are so assembled that the reference points and therefore the active portions of each electrode are aligned. In a specific embodiment, the lateral grid wires are wound about frame grids in such a manner that the grid wire is positioned upon the side rods of a frame grid structure at predetermined distances from the frame strap, which has been determined as the reference point of each of the grid structures. Further, the successive frame grids may be mounted on an insulating spacer in such a manner to provide an alignment of reference points of the successive electrodes. In a particular embodiment, the frame straps of each of the grid structures are mounted to abut directly with an insulating spacer. As a result, the insulating spacer provides a reference plane for the alignment of the adjacent lateral grid wires.

A second aspect of this invention provides that a minimal spacing can be achieved between successive grid electrodes by forming the second grid electrode or screen electrode of a frame grid having two side rods spaced and supported from each other by frame straps which are secured to one side of the side rods and having the lateral grid wires disposed upon the other side of the side rods. In an exemplary embodiment of this invention, a frame grid structure as described above is disposed at a minimal distance on both sides of a first frame grid structure (i.e., control grid) upon which the lateral grid wire has been wound on both sides of the support rods.

In a further aspect of this invention, an improved apparatus and method is taught for mass producing grid electrodes having aligned lateral grid wires. Briefly, a grid strip is formed by positioning two side rods in a parallel relation and precisely orientating the reference means upon successive lengths of the grid strip corresponding to the length of the individual electrodes. Next, the lateral grid wire is wound about the grid strip providing a whole number of turns about each of the successive lengths of the grids strips. Thus, a plurality of electrodes may be formed with their lateral wires disposed equal distances from a reference point. Finally, the electrodes may be assembled so that the reference points of the electrodes are disposed in a common plane and that adjacent portions of the lateral grid wires are aligned.

Further objects and advantages of the invention will become apparent as the following description proceeds and features of novelty which characterize the invention will be pointed out in particularity in the claims annexed to and forming a part of this specification.

For a better understanding of the invention reference may be had to the accompanying drawings, in which.

Figure 1:
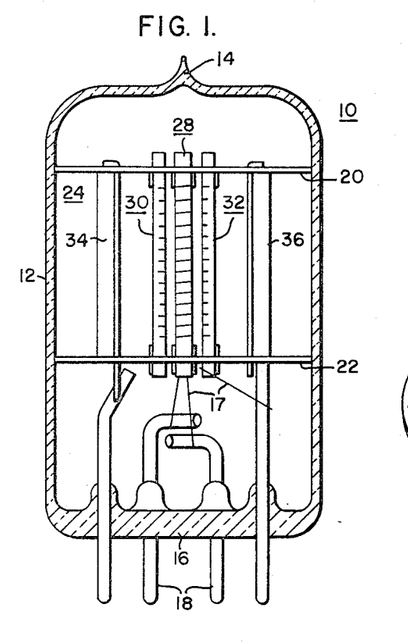
FIGURE 1 shows a partially sectioned view of an electron discharge device in which this invention has been incorporated.

Referring now to the drawings and in particular to FIG. 1, there is shown an electron discharge device 10 embodying the present invention in its preferred form. The electron discharge device 10 is comprised of an envelope 12 made of a suitable material such as glass with an electrode assembly indicated generally by the character 24 enclosed therein. The envelope 12 shown is of conventional design and includes a tipped off exhaust 14 on top of the envelope and a button stem header 16 closing off the bottom portion of the envelope 12. A plurality of electrically conductive terminals or lead elements 18 are sealed through the header 16 and are connected to the elements of the electrode structure 24 by the interconnecting leads 17. The terminals 18 not only supply the necessary voltage to the elements of the electrode assembly 24, but also act in conjunction with a pair of insulating spacer elements 20 and 22 to support the electrode assembly 24 within the envelope 12.

Figure 2:
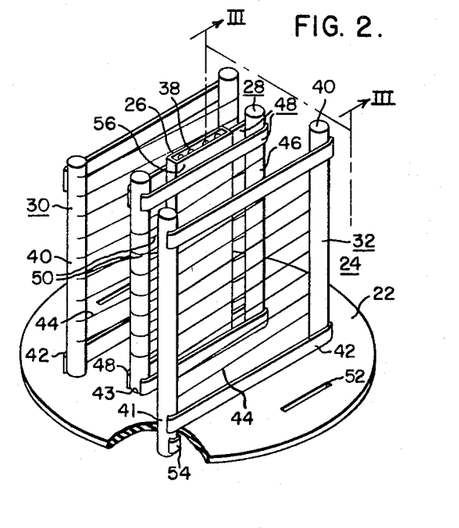
FIG. 2 shows an isometric view of an electrode assembly which has been incorporated in the electron discharge device shown in FIG. 1.

Referring now to FIGS. 1 and 2, the electrode assembly 24 includes an electron emissive element or cathode 26 of the indirectly heated type. A folded heater element 38 is disposed within the cathode 26 to energize a layer 56 of a suitable electron emissive material such as one of the barium, strontium carbonates. A control grid 28 is disposed about the cathode 26. The control grid 28 may be of the conventional full wound, frame grid type and is comprised (see FIG. 2) of a pair of upright, support or side rods 46 which are spaced and supported from each other by a plurality of flat, brace members or frame straps 48. It is noted that the first or control grid 28 is of the full wound variety having a grid wire 50 fixed upon the side rods 46 so as to lie on both sides of the control grid 28. Further, the frame straps 48 are disposed at either end of the grid 28 and on both sides of the side rods 46 to form a rigid, mechanically strong structure. Further, the side rods 46 of the control grid 28 are inserted and supported within apertures 43 placed in the insulating spacer elements 20 and 22. It is particularly noted, that the frame straps 48 abut directly against the insulating spacer elements 22 and 20 to provide a point of reference for the spacing of the grid wire 50.

A pair of screen grids 32 and 30 are disposed on either side of and in planes parallel to the control grid 28. The second or screen grids 30 and 32 are of the half frame variety and are comprised of (see FIG. 2) side rods 40 which are spaced and supported from each other by cross straps 42. In contradistinction to the structure of the control grid 28, the screen grids 32 and 30 are constructed so that the cross straps 42 are disposed upon a single side and at opposite ends of the screen grids. Upon the side opposite the cross straps 42, there is fixed a lateral grid wire 44. It is noted that that portion of the lateral grid wire 44 which had been wound on the same side of the screen grids 30 and 32 as the cross straps 42 has been removed. Further, the side rods 40 of the screen grids 30 and 32 are disposed within apertures 41 through the spacer elements 20 and 22. As will be explained in greater detail later, the cross straps 42 are disposed so as to directly abut the spacer elements 20 and 22; therefore, an alignment between the active portions of the lateral grid wires 44 and 50 may be achieved by winding the aforementioned lateral grid wires upon their respective grid structures at the same turns per inch and at a predetermined spacing from their cross straps 42 and 48.

Two substantially planar anode elements 34 and 36 (see FIG. 1) are disposed in planes parallel and on either side of the screen grids 30 and 32 respectively. The anode elements 34 and 36 are supported by the spacer elements 20 and 22; more specifically, each of the anode elements 34 and 36 have tab portions which extend through slots 52. As shown in FIG. 2, the side rods 40 and 46 may be secured to the spacer element 22 as by stops 54 which are secured to the side rods as by welding so as to abut directly against the spacer elements 22.

In one exemplary embodiment of this invention, the anode elements 34 and 36 are made of an aluminum clad steel. The side rods 40 and 46, and the frame straps 42 and 48 may be made of a material such as molybdenum and may be secured together as by welding. Further, the lateral grid wires 44 and 50 should be made of a material having essentially the same coefficient of expansion as the frame straps 42 and 48; in one embodiment of this invention, the lateral grid wire was made of a material such as plain or gold plated tungsten.

As is well known in the art, the noise in pentode and tetrode electron discharge devices is considerably higher than the noise in triode tubes if the electrode characteristics are the same. The equivalent noise resistances ($R_{eq.}$) of a pentode can be expressed as:

$$R_{eq.} = \frac{2.5 I_b}{(I_b + I_{c2})Gm}\left[1 + \frac{8 I_{c2}}{Gm}\right]$$

where:

$Gm$ is mutual conductance in mhos,
$I_b$ is anode current in amperes, and
$I_{c2}$ is the screen-grid current in amperes.

If the factor $8I_{c2}/Gm$ may be reduced to a negligible amount, the $R_{eq.}$ of the pentode approaches the $R_{eq.}$ of a triode assuming the same anode current $I_b$ and transconductance $Gm$. The factor $8I_{c2}/Gm$ can be made lower by reducing the screen grid current $I_{c2}$ or, in other words, by increasing the ratio $I_b/I_{c2}$. In conventional electron discharge devices wherein ordinary grid structures have been incorporated, the ratio $I_b/I_{c2}$ is, in general, lower than 20. As explained above, attempts have been made to visually align the lateral grid wires of the successive grid electrodes, and as a result, the ratios of $I_b/I_{c2}$ for these devices have been approximately 50.

Figure 3A:
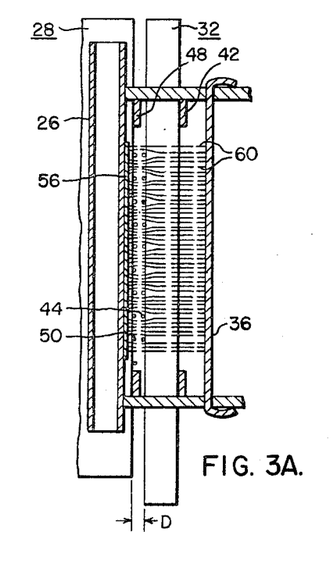
FIGS. 3A and 3B show sectioned views of the electrode assembly shown in FIG. 2 as taken through line III—III as shown in FIG. 2.
Figure 3B:
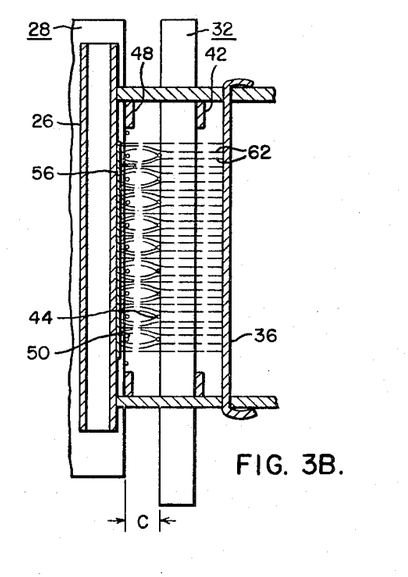

Referring now to FIGS. 3A and 3B, the effect of using small lateral grid wires and achieving a small spacing between the lateral grid wires of the successive grid structures is clearly shown. It may be understood that the electrons emitted from the layer 56 of electron emissive material are formed under the effect of the field of the control grid 28 into a plurality of beams or sheets (indicated generally by the numerals 60 and 62) of electrons. Referring now to FIG. 3B, it may be seen that as the sheets 62 of electron pass through the lateral grid wires 50 of the control grid 28, the sheets 62 tend to expand or diverge due to the electrical field of the screen grid 32. Therefore, it may be understood, that if the spacing C between the control grid and the screen grid is of a greater dimension, that the beam 62 of electrons will tend to be intercepted by the lateral grid wires 44 of the screen grid 32 thereby introducing a noise into the output of this device and increasing the ratio $I_b/I_{c2}$. In conventional tubes, the spacing C has been limited to a minimum value of approximately 20 mils due to the construction of the grid structures and to the inability of suspending the lateral grid wires to prevent their sagging or deformation.

Referring now to FIG. 3A, it may be understood that due to a significantly reduced spacing D between the control grid 28 and the screen grid 32, a substantial portion of an electron beam 60 will be directed through the interstices between the lateral grid wires 44 of the screen grid 32 and will be collected by the anode element 36. Thus, a significant reduction in the amount of current absorbed by the lateral grid wires 44 will be effected and the ratio $I_b/I_{c2}$ will be accordingly increased. This increase in the ratio $I_b/I_{c2}$ is further enhanced by the use of a lateral grid wire 44 having a diameter of about .0005 inch. In one specific embodiment of this invention, the lateral grid wire 50 has a diameter of .0003 and the lateral grid wire 44 has a diameter about .0005 inch with a spacing D between the laterally aligned grid wires of about .005 inch to thereby achieve a ratio of $I_b/I_{c2}$ in the range of 150 to 375. By achieving ratios of such great magnitude, the noise level ($R_{eq.}$) of a pentode electron discharge device may be reduced to a level similar to that of a normal triode.

As mentioned above, this invention contemplates the increase of the ratio $I_b/I_{c2}$ by reducing the spacing between the control grid and the screen grid, and by reducing the size of the lateral grid wires employed in the electrode structures. In order to utilize such fine lateral grid wire, it has been found necessary to use the frame grid type of structure. If ordinary, unsupported grid structures were used, the lateral grid wires would be easily deformed during the process of their assembly and would have a tendency to sag during the operation of the electron discharge devices in which they are incorporated. Thus, the frame grid type of structure has been particularly suited to the support of such fine lateral grid wires; however, it is not possible to use regular full, frame grids and screen grids, since the frame strap of the adjoining grids would normally prevent their being spaced at the required, close distances. In order to solve this problem, the structure as shown in FIGS. 1, 2 and 3 has been proposed. Specifically, the control grid 28 is of the full frame grid type having the frame straps 48 disposed on either side of the side rods 40, and the lateral grid wire 50 wound on either side thereof. In order to dispose the screen grids 30 and 32 at the extremely close distances from the control grid 28, it is proposed that the screen grids 30 and 32 be made of the half frame grid type having frame straps 42 placed on a single side of the side rods 40, and the lateral grid wires 44 placed on the opposite side of the side rods 40 from the frame straps 42. In this manner, the frame straps 42 will not interfere or make contact with the control grid 28 and an extremely close spacing may thereby be achieved.

As shown in FIGS. 3A and 3B, it is a significant aspect of this invention to align the active portions of the lateral grid wires 50 and 44 so that the beam of electrons may be directed through the interstices of the lateral grid wires 44. In ordinary grid structures wherein the lateral grid wire may have a dimension of .003 inch and is wound with a turns per inch of less than a hundred, it is a common process to visually align the lateral grid wires by adjusting the position of the side rods with respect to the insulating spacer elements. However, where the turns per inch of the lateral grid wire may exceed a hundred and/or the diameter of the lateral grid wire may be only .0003 inch, it becomes difficult if not impossible to visually align the lateral grid wires.

In the method of manufacture, as described with regard to this invention, a grid strip or ribbon 70 is provided having two, parallel disposed side rods 40 which are secured to each other by a plurality of the uniformly spaced cross straps 42 which may be secured as by welding to each of the side rods. It is noted that cross straps 42 (see FIG. 6) are disposed upon a plurality of successive lengths 71 of the ribbon 70. As will be explained in detail later, the cross straps 42 are precisely orientated with respect to each length 71 to act as a datum or reference point. The ribbon 70 is then rotated about its longitudinal axis while also being moved at the same time along its longitudinal axis and having a lateral wire 92 wound about its longitudinal axis. The lateral grid wire 92 is affixed to the side rods 40 of the ribbon 70 by any suitable method. In one particular embodiment of this invention, the turns of the lateral grid wire 92 are held in place by friction against the support rods 40 during the winding operation. The wound ribbon 70 may then be removed from the winding machine and the lateral grid wire 92 may be securely affixed to the support rods 40 by applying "glass frit" to the support rods 40 and cutting the "glass frit" by firing the wound ribbon 70 in a hydrogen furnace. After this procedure, the ribbon 70 is cut transversely according to the lengths 71 to form a plurality of individual frame grids.

Figure 5:
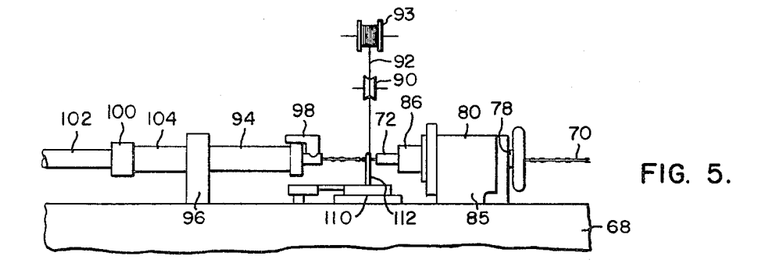
FIG. 5 shows a partial front view of a grid lathe upon which the grid electrodes of this invention are wound.

Referring in detail to FIG. 5, a machine such as a lathe suitable for manufacturing grids by the above method is shown. The prepared ribbon 70 as described in the preceding paragraph is inserted through a hollow shaft portion 78 of a winding head 80, which is supported upon a base 68 by an element 85. A spring guide 72 is attached to a chuck member 86, which is in turn supported upon the winding head 80. The spring guide 72 (which has been thoroughly described in U.S. Patent No. 2,853,104) is a specially designed device which will hold the ribbon 70 with a minimum of lateral movement as the ribbon 70 passes longitudinally therethrough without deforming the ribbon 70.

A single strand of the lateral grid wire 92 is fed from a spool 93 onto the ribbon 70. A tensioning member 90 which abuts against the wire 92 provides the proper tension upon the grid wire 92 during the winding process. The grid wire 92 is directed upon the ribbon 70 by a wire guide 112, which is in turn mounted upon a positioning mechanism 110 (which will be described in detail later). The wire guide 112 ensures the precise placement of the grid wire 92 upon the ribbon 70 and prevents the grid wire 92 from being pulled to the left during the winding process.

One end of the ribbon 70 is attached to a shaft 104 of a longitudinally movable member 94 by a clamp 98. The movable member 94 is held in position upon the base 68 by a member 96 so as to be rotatively disposed about its longitudinal axis which is in substantial alignment with the longitudinal axis of the ribbon 70. A split thread guide 100 is provided on the opposite end of the shaft 104 of the member 94 and a fixed threaded rod 102 is threaded into the split thread guide 100. The winding head 80, and the member 94 are driven by a common gear system and motor (not shown) so as to rotate at a high rate of speed substantially about the longitudinal axis of the ribbon 70. Since the split thread guide 100 is prevented from rotating while the shaft 104 and clamping member 98 are permitted to rotate, the threaded rod 102 will gradually screw into the split thread guide 100. Since the member 94 may move along its longitudinal axis, it will move to the left and thus the ribbon 70 will be drawn along its longitudinal axis to the left (as shown in FIG. 5), while being rotated about its longitudinal axis. The threading on the rod 102 thus determines the turns per inch of the lateral grid wires 92 on the grid frame.

Figure 6:
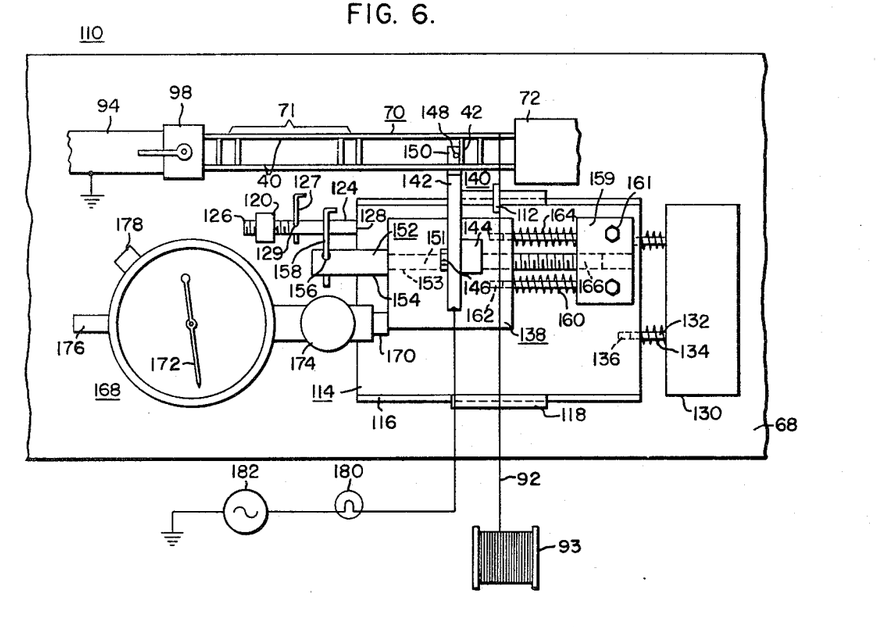
FIG. 6 shows an enlarged, plan view of the grid lathe shown in FIG. 5.
Figure 7:
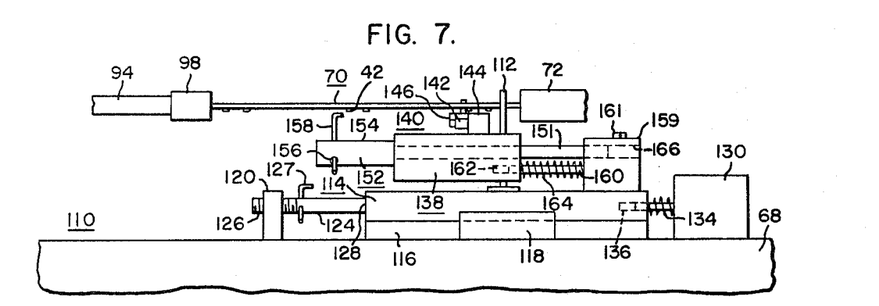
FIG. 7 shows an enlarged, front view of the grid lathe shown in FIG. 5.

As shown in FIG. 5, the positioning mechanism 110 is disposed upon the base 68 of the machine to accurately adjust the position of the winding of the lateral grid wire 92 upon the ribbon 70 at specified distances from the frame straps to a precision of $10^{-6}$ inches. Referring now to FIGS. 6 and 7, a more detailed description of the positioning mechanism 110 will be given. The positioning mechanism 110 comprises a first platform 114 which is movably disposed in a direction parallel to the ribbon 70 upon the base 68. The first platform 114 has two bevels 116 extending upon either side; two L-shaped retaining members 118 are fixedly secured to the base 68 so as to receive the bevels 116 in a sliding arrangement. Means are disposed on either side of the first platform 114 to precisely position the first platform 114 with respect to the base 68; these means comprise a rod 124 having a cam surface 128 directly abutting upon one end of the first platform 114, and a threaded portion 126 which is supported by a member 120. The member 120 has a threaded aperture which meshes with the threaded portion 126 of the rod 124. Further, an aperture 129 is provided within the rod 124 to receive a lever-like tool 127, which may be rotated in either direction to effect a movement of the rod 124. It is noted that the threads upon the rod 124 are very close so that fine, precise movements may be imparted to the first platform 114. On the other side, the first platform 114 is positioned by a member 130 having rods 132 fixedly secured thereto. The other ends of the rods 132 are received slidably into apertures 136 within the first platform 114. A resilient member or spring 134 is disposed about each of the rods 132 so that a constant force is applied against the first platform 114. Thus, it may be seen that the first platform 114 is resiliently pressed against the cam surface 128 of the rod 124 and that the lateral motion of the first platform 114 may be effected in either direction by the rotation of the tool 127.

A second platform 138 is disposed upon the first platform 114 in a manner now to be described. A member 159 is fixedly secured to the first platform 114 by any suitable means such as bolts 161. A rod 152 has an enlarged portion 154 which abuts against one side of the second platform 138, and a threaded portion 151 which is slidably received within an aperture 153 of the second platform 138. The narrow, threaded portion 151 of the rod 152 extends through the aperture 153 and is engagingly received by a threaded aperture 166 of the member 159. Further, a pair of support rods 160 are fixedly secured to the member 159; the other end of the support rods 160 are slidably received within guiding apertures 162. A resilient means or spring member 164 is disposed about each of the support rods 160 and resiliently presses the second platform 138 against the enlarged portion 154 of the rod 152. The enlarged portion 154 of the rod 152, in addition, has an aperture 156 through which may be inserted a tool 158. Therefore, it may be understood that the tool 158 may be rotated in either direction to impart a longitudinal motion to the second platform 138 in either direction depending on the direction in which the tool 158 is rotated.

Further, a means for sensing or orientating assembly 140 is disposed in a fixed relationship upon the second platform 138. In particular, the orientating assembly 140 comprises a member 144 which is directly secured to the second platform 138 and is made of an electrically insulating material. Further, a lever 142 is pivotally mounted upon the member 144 as by a bolt 146 in a plane perpendicular to the ribbon 70. A stop rod 148 is disposed upon one end of the lever 142. As it may be seen in FIGS. 6 and 7, the lever 142 may be so rotated that the stop rod 148 may be disposed between the side rods 40 so as to abut against one of the frame straps 42 of the ribbon 70. It is noted that only a limited adjustment can be made when the ribbon 70 is secured within the clamping member 98, and that a fine adjustment can be made by rotating the rod 124 so that the stop rod 148 will abut the frame strap 42.

Referring now specifically to FIG. 6, means are provided to indicate precisely when the stop rod 148 touches or abuts the frame strap 42. In an illustrative embodiment of this invention, an electrical connection is made between the lever 142 and a lamp 180, which is in turn connected in series to a voltage source 182 to ground. It may be well understood that the lever 142 and the stop rod 148 are made of an electrically conductive material so that a closed circuit through the voltage source 182 and the lamp 180 may be made when the stop rod 148 contacts the frame strap 42. It is noted that the ribbon 70 and the movable member 94 act as one part of the electrical circuit to ground and that the lever 142 is insulated by suitable means from the lathe to provide another electrical path to the source 182.

As shown in FIG. 6, a precise measuring means 168 such as a micrometer is fixedly secured upon the base 68 by a support member 174. It is noted that the measuring means 168 has not been shown in FIG. 7 for purposes of clarity, but it may be understood that such a means would be incorporated as shown in FIG. 6. The measuring means 168 has been selected in this illustrative embodiment to be a micrometer (which are well known in the art and are commercially available); the measuring means 168 has a spring biased activating member 170 which directly abuts against and measures precisely (i.e., $\pm 10^{-6}$ inch) the position of the second platform 138 with respect to the base 68. Further, the measuring means 168 has an indicating needle 172 which may be visually read by the operator of this machine. The measuring means 168 also has a reset adjustment 176 for varying the position of the activating member 170 and an adjustment 178 to reset the indicating needle 172.

Further, the means for guiding or guide member 112 is fixedly secured to the first platform 114 so as to present a flat surface transverse to the ribbon 70. The lateral grid wire 92 is unwound from the spool 93 and is secured to the ribbon 70 in a manner so as to lie against the transverse surface of the guide member 112. Therefore, it may be understood that there has been shown and described a means which is capable of guiding the lateral grid wire 92 upon the ribbon 70 at a precise distance or distances from the frame strap 42 which has been chosen in this illustrative embodiment as the reference point for each of the frame grids and for the ribbon 70. Further, the distance between the frame strap 42 and the point at which the lateral grid wire is positioned upon the side rods may be varied precisely by repositioning the second platform 138 as by turning the rod 152, and noting the movement upon the measuring means 168.

In the process of maunfacturing electron discharge devices as shown in FIG. 1, the first step is to wind the control grid 28 and the screen grids 32 and 30 upon the grid lathe as shown in FIGS. 5, 6 and 7. It is a significant aspect of this invention, that a full number of turns of the lateral grid wire 92 be wound upon each of the grid structures 30, 32 and 28. Typically, this may be accomplished by setting the turns per inch with which the lateral grid wire 92 is to be wound upon the ribbon 70 at a fractional value dependent upon the length of the individual frame grid electrode so that the total number of turns wound thereon is a whole number. As mentioned before, the turns per inch is dependent upon the threads per inch of the rod 102, and also upon the velocity with which the ribbon 70 is being rotated. In this manner, it may be assured that each turn of the lateral grid wire 92 may be placed at a precise point with reference to the frame strap 42.

The first step of winding the ribbon 70 is to securely clamp the ends of the ribbon 70 within the clamping member 98 so that the stop rod 148 is positioned to be closely spaced from the frame strap 42. The precise positioning of the stop rod 148 may be accomplished by rotating the rod 124 thereby repositioning the first platform 114 until the lamp 180 becomes lighted to indicate that there is a contact between the stop rod 148 and the frame strap 42. Though it may be understood that either the screen grid electrodes 30 and 32, or the control grid 28 could be wound first, for the purposes of explanation, the control grid 28 will be wound first. After the ribbon 70 has been prepared and set up on the lathe machine the lateral wire 50 (i.e., 92 in FIG. 6) may be precisely positioned with respect to the frame strap 48 as they are wound about the side rods 46. After each of the ribbons 70 has been completely wound and removed from the grid lathe, the lateral wire 50 is securely affixed to the side rods 46 and the ribbon 70 is separated so as to produce the individual grid structures 28. It is a significant aspect of this invention that each of the frame grids 28 are wound with a whole number of turns over the entire length 71 of the frame grid (i.e., including the loose turns disposed between the frame straps of adjacent grids) so that the lateral grid wires are placed thereon in turns that are precisely the same distance from the frame strap 48 for each of the frame grids. As a result of this procedure, any of the screen grids 30 and 32 may be matched with any of the control grids 28 to achieve the desired alignment of the active portions of these electrodes.

Figure 8:
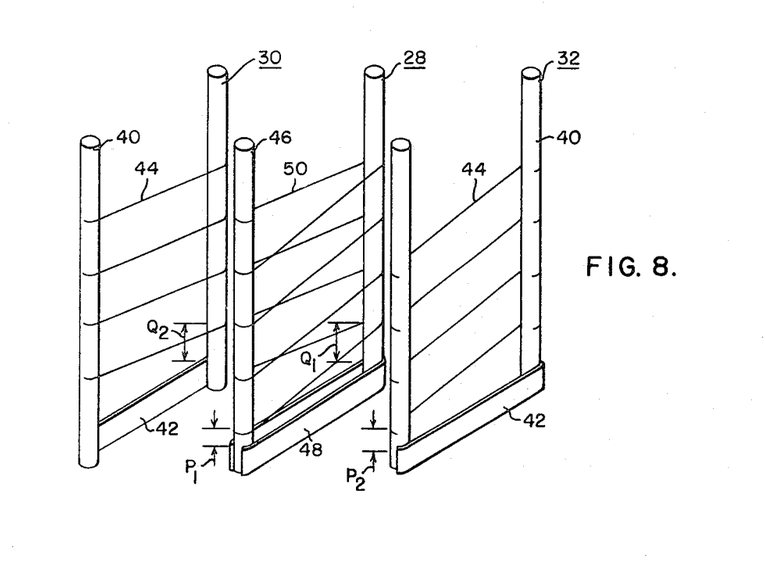
FIG. 8 shows a partial isometric view of the grid assembly shown in FIG. 2.

After the control grids 28 have been wound, the next step is to wind the screen grids 30 and 32, which are of the half-frame grid type. Referring now to FIGS. 1, 2 and 8, it is noted that the relaitonship of the screen grids 30 and 32 to the control grid 28 may necessitate the winding of the screen grids 30 and 32 in a direction opposite to the winding of the control grid 28, e.g., if the control grid is "right" wound (clockwise), then the screen grids may be "left" wound (counterclockwise).

Referring now to FIG. 8, the distance between the starting point of the control grid 28 and the cross strap 48 is designated $P_1$. It is evident that the lateral grid wire 44 of the screen grid 32 should be initially placed upon the side rod 40 at a distance $P_2$ from the frame strap 42 which is equal to distance $P_1$. Assuming that the widths of the control grid 28 and screen grid 32 are the same, the lateral grid wires 44 and 50 will be aligned with each other. Due to the placement of the screen grid 30 upon the opposite side of the control grid 28, the starting point of the lateral grid wire 44 of the screen grid 30 has to be aligned with that potrion of the lateral grid wire 50 of the control grid 28 which is disposed on the side of the control grid 28 adjacent the screen grid 30 and spaced a distance $Q_1$ from the frame strap 48. The lateral grid wire 44 of the screen grid 30 is therefore spaced a distance $Q_2$ from the frame strap 42 equal to the distance $Q_1$, which is essentially one-half of the pitch (i.e., the distance between successive turns of the grid wire) greater than the distance $P_1$. If the width of the control and screen grids, and/or the diameter of the support rods of the control screen grids are not equal, the distances $P_1$ and $P_2$, and $Q_1$ and $Q_2$ may be made unequal to achieve the desired alignment. Thus, it may be seen that by so setting the placement of the lateral grid wires upon the side rods and winding the lateral grid wire 50 and 44 in opposite directions, the active portions (i.e., that portion of a lateral grid wire between the side rods which traverse the sheet of electrons) can be made to align or overshadow each other.

Referring now to FIG. 6, the offsetting of the lateral wire 44 upon the control grid 30 may be effected in the following manner. First, the ribbon 70 which is of the half frame type is secured to the clamping member 98 so that the one of the frame straps 42 nearly abuts against the rod 148. It may be realized that the distance between the stop rod 148 and the guide member 112 determines the distance between the frame strap and the starting point at which the lateral grid wire is placed upon the side rods. Therefore, in order to provide the necessary offset (distance $Q_2$ in FIG. 8), the rod 152 is rotated so as to increase the spacing between the stop rod 148 and the guide member 112. The exact amount of this offset can be accurately determined and measured by the measuring means 168. In practice, the activating member 170 is adjusted to precisely abut against the second platform 138 and the indicating needle 172 would be reset to zero as by the adjustment 178. The rod 152 would then be rotated and the longitudinal movement of the second platform 150 could be accurately read upon the indicating needle 172. After the precise offset or increase of the distance beweten the stop rod 148 and the guide member 112 has been achieved, the stop rod 148 is brought into engagement with the frame strap 42 (which contact will be indicated by lamp 180) by repositioning the first paltform 114 by the rod 124. Then, the lever 142 is rotated out of engagement, and the aletral grid wire is wound about the ribbon 70.

After the ribbon 70 of the full frame type has been wound and the lateral wire is affixed to ribbon 70 by means of "glass frit," the assembly is fired in a hydrogen furnace and cut into individual structures. Next, the control grids 28 and the screen grids 30 and 32 are assembled into the electrode assembly 24. As shown particularly in FIGS. 1 and 2, it is a significant aspect of the invention that each of the grids 28, 30 and 32 be placed within their respective apertures of the insulating spacing element 22 so that the frame straps 42 and 48 directly abut against the surface of the spacer element 22. In this manner, the frame straps are orientated in substantially the same plane and as a result the active portions of the lateral grid wires 44 and 50 which are precisely orientated with respect to their frame straps are aligned within this electrode assembly 24. In order to securely affix the side rods 40 and 46 to the spacer element 22, the tabs 54 are then secured to each of the side rods as by welding. Then, the spacer element 20 is placed upon the electrode assembly 24 so as to fixedly receive each of the side rods and the cathode element. Finally, the electrode assembly 24 is placed within the envelope 12 and a vacuum established therein in a manner well known in the art.

In one specific, illustrative embodiment of this invention, each of the grid structures 28, 30 and 32 was made .450 inch long and the frame strap of each of these grid structures was placed .300 inch apart. The control grid was made of side rods 46 having a diameter of .045 inch and was wound with a lateral grid wire 50 having a diameter of .0003 inch. Each of the screen grids 30 and 32 was made of side rods 40 having a diameter of .0305 inch and was wound with a lateral grid wire 44 having a diameter of .0005 inch. The lateral grid wires of both the control grid and the screen grid was wound with 41 full turns of lateral grid wire across the entire length of the structure. In order to provide a full number of turns upon the grid structures, the turns per inch was set at the fractional value of 91.30000 turns per inch. It is particularly pointed out that this adjustment is set with great precision and that it may be determined to an accuracy of $10^{-5}$ or $10^{-6}$ inch. Further, the offset (spacing $Q_2$ as shown in FIG. 8) was in this embodiment determined to be four microns.

Figure 4A:
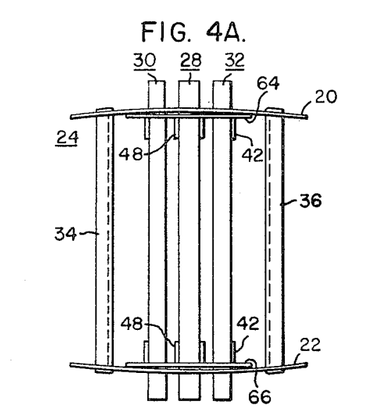
FIGS. 4A and 4B shows side views of additional embodiments of the electrode assembly shown in FIG. 2.
Figure 4B:
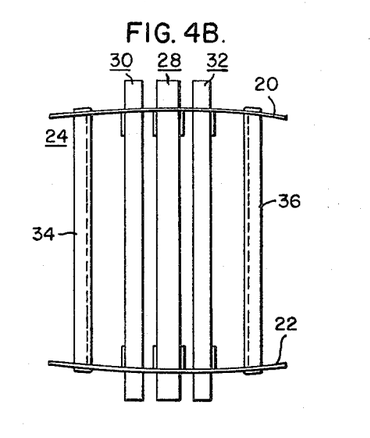

Referring now to FIGS. 4A and 4B, modifications of the electrode assembly 24 as shown in FIGS. 1 and 2 are set out. In FIG. 4B, there is shown an electrode assembly 24 in which the anode elements 34 and 36 are slightly shortened so that they are connected to the spacer elements 20 and 22 to impart a slight degree of curvature to the spacer elements thereby securing and clamping the grid structures 28, 30 and 32 therebetween. In a further modification of this invention as shown in FIG. 4A, a pair of auxiliary, inner spacers 64 and 66 are inserted between the frame straps 48 and 42 and the spacer elements 20 and 22 to thereby prevent the possible misplacement or misalignment of the grid structures due to the unintended bending of the spacer elements 20 and 22.

It will, therefore, be apparent that there has been disclosed an electron discharge device which is capable of more efficient performance and which may be assembled with a lesser expenditure of labor. More specifically, there has been disclosed a method and apparatus for winding the grid structures for an electron discharge device capable of adoption to mass production wherein the active portions of the lateral grid wires of the successive grid structures may be aligned with extreme precision. Further, there has been disclosed an electrode structure for such an electron discharge device in which the lateral grid wires of the screen grid may be accurately and precisely disposed from the grid wires of the control grid at a distance of approximately .005 inch. In addition, the electrode structure shown herein is particularly adapted to support extremely fine lateral grid wires in an aligned or overshadowing relationship with each other.

While there has been shown and described what are presently considered to be the preferred embodiments of this invention, modifications thereto will readily occur to those skilled in the art. It is not desired, therefore, that the invention be limited to the specific arrangements shown and described and it is intended to cover in the appended claims all such modifications as fall within the true spirit and scope of the invention.

We claim as our invention:

1. An electrode assembly for an electron discharge device comprising first, second and third electrodes; said first electrode having two side rods, regular arrays of parallel active portions of grid wire disposed on both sides of said first grid electrode, and frame straps disposed between and fixedly secured on both sides of said side rods, said active portions being spaced from said frame straps by predetermined amounts; said second and third electrodes having two side rods, lateral grid wire disposed between and secured on a first side of said side rods of said second and third electrodes to provide a regular array of parallel active portions of said grid wires, and a frame strap disposed between and fixedly secured on a second side of said side rods opposite said first side, said active portions of said second and third electrodes being spaced from said frame straps by differing predetermined amounts; and an insulating planar element for mounting said first, second and third electrodes, said second and third electrodes being disposed upon said planar element so that the grid wires of said first side of said second and third electrodes are disposed in a substantially parallel relationship with the active portions of grid wire of both sides of said first grid electrode, said frame straps of said first, second and third electrodes abutting said element to thereby orientate said adjacent active portions of said first electrode and said second and third electrodes in an aligned relationship.

2. An electron discharge device comprising a first, second and third grid electrode; said first grid electrode having two side rods, lateral grid wire wound about and secured to said side rods to provide a regular array of parallel active portions of said grid wire on both sides of said side rods, and frame straps disposed between and fixedly secured on both sides of said side rods, said active portions being spaced from said frame straps by predetermined amounts; said second and third grid electrodes having two side rods, lateral grid wire disposed between and secured on a first side of said side rods of said second and third electrodes to provide a regular array of parallel active portions of said grid wire, and a frame strap disposed between and fixedly secured only on a second side of said side rods opposite said first side, said active portions of said second and third grid electrode being spaced from said respective frame straps by differing predetermined amounts; a pair of insulating elements for mounting said first, second and third electrodes, said first, second and third electrodes being disposed between said insulating elements so that said second and third electrodes have said first side facing said first electrode in a close, parallel relationship, said frame straps of said first, second and third electrodes abutting said elements to thereby orientate said adjacent active portions of said first electrode and said second and third electrodes in an aligned, substantially parallel relationship; and a first and second anode element disposed between and secured to said insulating elements on either side of said second and third electrodes, said first and second anodes having a dimension as taken between said elements smaller than the dimension of said second and third electrodes as presented between said elements to thereby securedly support said first, second and third electrodes between said elements.

3. An electrode assembly for an electron discharge device comprising first, second and third grid electrodes; said first grid electrode having two side rods, lateral grid wire wound about and secured to said side rods to provide regular arrays of parallel active portions of said grid wire disposed on both sides of said first electrode, and frame straps disposed between and fixedly secured on both sides of said side rods, said active portions being spaced from said frame straps by predetermined amounts; said second and third grid electrodes each having two side rods, lateral grid wires disposed between and secured on a first side of said side rods of said second electrode to provide a regular array of parallel active portions of said grid wire, and a frame strap disposed between and fixedly secured on a second side of said side rods opposite said first side, said active portions of said second and third grid electrode being spaced from said respective frame straps by differing predetermined amounts; a first pair of insulating elements for mounting said first, second and third electrodes, said first, second and third electrodes being disposed between said first pair of insulating elements so that said second and third electrodes are disposed upon opposite sides of said first electrode in a close, parallel relationship; and a second pair of insulating, planar elements disposed between said first, second and third electrodes and said first pair of insulating elements, said frame straps of said first, second and third electrodes abutting said second pair of planar elements to thereby orientate the adjacent active portions of said first electrode and said second and third electrodes in an aligned, substantially parallel relationship.

4. An electrode assembly for an electron discharge device comprising first, second and third electrodes; said first grid electrode having two side rods, lateral grid wire wound in a first direction, to provide a given spacing between the turns of said lateral grid wire, said lateral grid wire suspended between said side rods to provide a regular array of parallel active portions disposed on both sides of said first grid electrode, and frame straps disposed between and fixedly secured to both sides of said side rods, said lateral grid wire being disposed with respect to said frame straps by a first distance; said second and third electrodes having two side rods, lateral grid wire wound in a second direction opposite to said first direction about and secured on a first side of said side rods of said second and third electrodes to provide regular arrays of parallel active portions of said grid wire, and a frame strap fixedly secured on a second side of said side rods opposite said first side to space said side rods of said second and third electrodes a distance apart equal to that of said side rods of said first electrode; and an insulating planar element for mounting said first, second and third electrodes, said second and third electrodes being disposed upon opposite sides of said first electrode so that the grid wires disposed upon said first side of said second and third electrodes are disposed in a substantially parallel relationship with the grid wires of both sides of said first electrode, said lateral grid wire of said second electrode being disposed with respect to said frame strap of said second electrode by a second distance equal to said first distance, said lateral grid wire of said third electrode being spaced from said frame strap of said third electrode a third distance which is larger than said first distance by an amount equal to one half of said given spacing, said frame straps of said first, second and third electrodes abutting said element to orientate said adjacent active portions of said first electrode and said second and third electrodes in an aligned relationship.

5. An electron discharge device comprising first and second electrodes, each of said first and second electrodes having two support members for suspending a lateral grid wire wound in a regular helical array about said support members and a reference means associated with at least one of said two support members, said lateral grid wire of said first electrode wound in a first direction, said lateral grid wire of said second electrode wound in a second direction opposite to said first direction; and an element for supporting said electrodes, said reference means of said first and second electrodes abutting said element, said grid wires of said first and second electrodes being spaced from their respective reference means by first and second distances respectively, said first distance differing from said second distance to ensure that adjacent portions of said lateral wire are aligned with each other.

6. An electron discharge device substantially as claimed in claim 5, wherein said support members of said first and second electrodes are disposed in a parallel relation and spaced equally apart, said first distance differing from said second distance by an amount equal to one half the distance between the turns of said helical array.

7. An electrical device comprising first, second and third electrodes, each of said electrodes having two side rods, lateral grid wire wound in turns of constant pitch and suspended between said side rods to provide a regular array of parallel active portions of said grid wire, and reference means positioned upon at least one of said side rods, said first electrode being wound in a first direction, said second and third electrodes being wound in a second direction opposite to said first direction, said second and third electrode disposed upon opposite sides of said first electrode, and an element for supporting each of said electrodes, said reference means of each electrode abutting said element in a common plane, said turns of said first, second and third electrodes respectively spaced first, second and third distances from said reference means to align adjacent active portions of said first and said second and third electrodes.

8. An electrical device substantially as claimed in claim 7, wherein said support rods of each of said electrodes are disposed in a parallel relationship and spaced equally apart, said first distance equalling said second distance, said third distance being greater than said first distance by an amount equal to one half the distance between said turns of constant pitch.

9. An electrode assembly for an electron discharge device comprising first and second electrodes, each of said first and second electrodes having two support members for suspending a lateral grid wire wound from a starting point in a regular helical array about said support members and reference means associated with at least one of said two support members, said lateral grid wire of said first electrode wound in a first direction, lateral grid wire of said second electrode wound in a second direction opposite to said first direction; and means for supporting said first and second electrodes with respect to each other, said grid wires of said first and second electrodes being spaced from their respective reference means by first and second distances respectively, said first distance differing from said second distance to insure that adjacent portions of said lateral grid wires are aligned with respect to each other.

10. An electrode assembly as claimed in claim 9 wherein said support members of said first and second electrodes are spaced approximately equally apart, said first distance differing from said second distance by an amount equal to approximately one-half the distance between the turns of said helical arrays.

11. An electrode assembly for an electron discharge device comprising first and second electrodes, each of said first and second electrodes having a pair of support members, said first electrode having a grid wire wound from a first starting point in a first direction about said side rods and at least one cross strap secured to said support members, said second electrode having at least one cross strap disposed only upon a first side of said support members and a grid wire wound from a second starting point in a second direction about said support members to provide a regular array of active portions of said grid wire upon a second side of said rods opposite from said first side, and means abutting said cross straps of said first and second electrodes for orientating said first and second electrodes with respect to each other, said first electrode orientated with respect to said second electrode so that said second side is disposed in an adjacent relation with the grid wire of said first electrode.

12. An electrode assembly as claimed in claim 10, wherein said support of said first and second electrodes are spaced substantially equally apart, the distance between said first starting point and said cross strap of said first electrode differing from the distance from said second starting point and said cross strap of said second electrode by an amount equal to one half of the distance between the turns of the windings of said first and second electrodes.

13. An electrode assembly for an electron discharge device comprising first, second and third electrodes; said first electrode having two support members, a lateral grid wire wound about said support members to produce a regular array of parallel active portions on both sides of said first electrode, and reference means associated with at least one of said two support members; said second and third electrodes having two support members, a plurality of parallel wires disposed between and secured to said support members, and reference means associated with at least one of said two support members; and means for supporting said first, second and third electrodes with respect to each other, said plurality of grid wires of said second and third electrodes disposed in a substantially parallel relation with said active portions disposed on both sides of said first electrode, said grid wires of said first, second and third electrodes being spaced from the respective reference means by first, second and third distances respectively, said second distance being different from said third distance to insure that adjacent portions of said lateral grid wires are aligned with respect to each other.

14. An electrode assembly as claimed in claim 13, wherein said two support members of said first, second and third electrodes are spaced substantially equally apart, said first distance equalling said second distance, and said second distance different from said third distance by an amount equal to one-half of the distance between the turns of the winding of said first electrode.

References Cited

UNITED STATES PATENTS

| | | | |
|---|---|---|---|
| 3,114,071 | 12/1963 | Weber et al. | 313—350 |
| 3,213,313 | 10/1965 | Miale | 313—350 |
| 3,240,981 | 3/1966 | Haegele | 313—350 |

FOREIGN PATENTS

| | | |
|---|---|---|
| 1,304,417 | 10/1962 | France. |
| 1,095,209 | 12/1954 | France. |
| 1,001,424 | 1/1957 | Germany. |
| 597,264 | 8/1959 | Italy. |

JOHN W. HUCKERT, *Primary Examiner.*

A. J. JAMES, *Assistant Examiner.*